US010596708B2

(12) United States Patent
Park et al.

(10) Patent No.: US 10,596,708 B2
(45) Date of Patent: Mar. 24, 2020

(54) INTERACTION DEVICE AND INTERACTION METHOD THEREOF

(71) Applicant: Electronics and Telecommunications Research Institute, Daejeon (KR)

(72) Inventors: Cheonshu Park, Daejeon (KR); Jae Hong Kim, Daejeon (KR); Daeha Lee, Daejeon (KR); Min Su Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 213 days.

(21) Appl. No.: 15/466,085

(22) Filed: Mar. 22, 2017

(65) Prior Publication Data

US 2017/0274535 A1    Sep. 28, 2017

(30) Foreign Application Priority Data

Mar. 23, 2016    (KR) .................. 10-2016-0034779

(51) Int. Cl.
*B25J 11/00*    (2006.01)
*G06F 3/01*    (2006.01)
(Continued)

(52) U.S. Cl.
CPC ........... *B25J 11/0005* (2013.01); *G06F 3/012* (2013.01); *G06F 3/013* (2013.01); *G06F 3/017* (2013.01);
(Continued)

(58) Field of Classification Search
CPC ....... G01L 17/26; G01L 25/48; G06F 17/279; G06F 3/017; G06F 3/012; G06F 3/013; B25J 11/0005
See application file for complete search history.

(56) References Cited

U.S. PATENT DOCUMENTS 5,657,250 A    8/1997  Park et al.
7,809,569 B2   10/2010 Attwater et al.
(Continued)

OTHER PUBLICATIONS

Kristiina Jokinen et al., "Gaze and Turn-Taking Behavior in Casual Conversational Interactions", ACM Transactions on Interactive Intelligent Systems, vol. 3, No. 2, Article 12, Pub. date: Jul. 2013.

*Primary Examiner* — Dale Moyer
(74) *Attorney, Agent, or Firm* — William Park & Associates Ltd.

(57) ABSTRACT

The present disclosure herein relates to an interaction device capable of performing an interaction with a human, and more particularly, to an interaction device capable of performing an interaction with a plurality of participants. The interaction device includes a role classifying unit configured to classify a role for each of a plurality of participants based on an external stimulus signal for each of the plurality of participants and an action adjusting unit configured to perform different interaction operations for each of the plurality of participants based on the role for each of the plurality of participants. An interaction device according to an embodiment of the present application classifies the roles of a plurality of participants according to a participation degree and/or an action state and provides a customized interaction operation for each of participants according to the classified roles. Therefore, it is possible to perform a natural interaction operation with a plurality of participants.

15 Claims, 8 Drawing Sheets

(51) Int. Cl.
  *G10L 25/48* (2013.01)
  *G10L 25/78* (2013.01)
  *G10L 25/90* (2013.01)

(52) U.S. Cl.
  CPC ...... *G10L 25/48* (2013.01); *G06F 2203/0381* (2013.01); *G10L 25/78* (2013.01); *G10L 25/90* (2013.01); *Y10S 901/46* (2013.01); *Y10S 901/47* (2013.01)

(56) References Cited

U.S. PATENT DOCUMENTS

| | | |
|---|---|---|
| 8,131,553 B2 | 3/2012 | Attwater et al. |
| 2006/0206329 A1 | 9/2006 | Attwater et al. |
| 2010/0017212 A1 | 1/2010 | Attwater et al. |
| 2011/0153079 A1 | 6/2011 | Jung et al. |
| 2014/0132505 A1* | 5/2014 | Vennelakanti ......... G06F 3/017 345/156 |
| 2014/0277735 A1* | 9/2014 | Breazeal ............ B25J 11/0005 700/259 |
| 2015/0314454 A1* | 11/2015 | Breazeal ............... B25J 9/0003 700/259 |
| 2018/0009118 A1* | 1/2018 | Yamaga ................ B25J 19/026 |

* cited by examiner

INTERACTION DEVICE AND INTERACTION METHOD THEREOF

CROSS-REFERENCE TO RELATED APPLICATIONS

This U.S. non-provisional patent application claims priority under 35 U.S.C. § 119 of Korean Patent Application No. 10-2016-0034779, filed on Mar. 23, 2016, the entire contents of which are hereby incorporated by reference.

BACKGROUND

The present disclosure herein relates to an interaction device capable of performing an interaction with a human, and more particularly, to an interaction device capable of performing an interaction with a plurality of participants.

Techniques for interaction between human and robot have been studied. Human-robot interaction technology refers to a technology that allows a robot to communicate and collaborate with humans by determining a user's intent and performing appropriate responses and behaviors. One of the important techniques in the interaction between robot and human is turn-taking technology. Turn taking means exchanging a sequence of interactions such as conversation between participants in an interaction.

However, conventional technologies for interaction between human and robot, including the turn taking technology, control interaction based on one-to-one interaction between human and robot. Therefore, it is difficult to perform natural interaction when a robot interacts with two or more humans.

SUMMARY

The present disclosure provides an interactive device and method capable of performing a natural interaction with at least two participants.

An embodiment of the inventive concept provides a interaction device including: a role classifying unit configured to classify a role for each of a plurality of participants based on an external stimulus signal for each of the plurality of participants; and an action adjusting unit configured to perform different interaction operations for each of the plurality of participants based on the role for each of the plurality of participants.

In an embodiment, the role classifying unit may include: a stimulus analyzing unit configured to analyze external stimulus information on each of the plurality of participants; a participation degree calculating unit configured to calculate a participation degree value for each of the plurality of participants based on the external stimulus information; and a role determining unit configured to determine a role for each of the plurality of participants based on the participation degree value of each of the plurality of participants.

In an embodiment of the inventive concept, an interaction method includes: receiving external stimulus information on each of a plurality of participants from a multi-modal sensor unit; determining a participation action state of each of the plurality of participants based on the external stimulus information on each of the plurality of participants; determining a role of each of the plurality of participants based on the external stimulus information on each of the plurality of participants; and performing different interaction operations for the plurality of participants based on at least one of a participation action state of each of the plurality of participants or a role of each of the plurality of participants.

In an embodiment, the determining of the participation action state of each of the plurality of participants and the determining of the role of each of the plurality of participants may be performed in parallel.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, the technical idea of the present application will be described in more detail with reference to the accompanying drawings so that those skilled in the art easily understand the technical idea of the present application.

Figure 1:
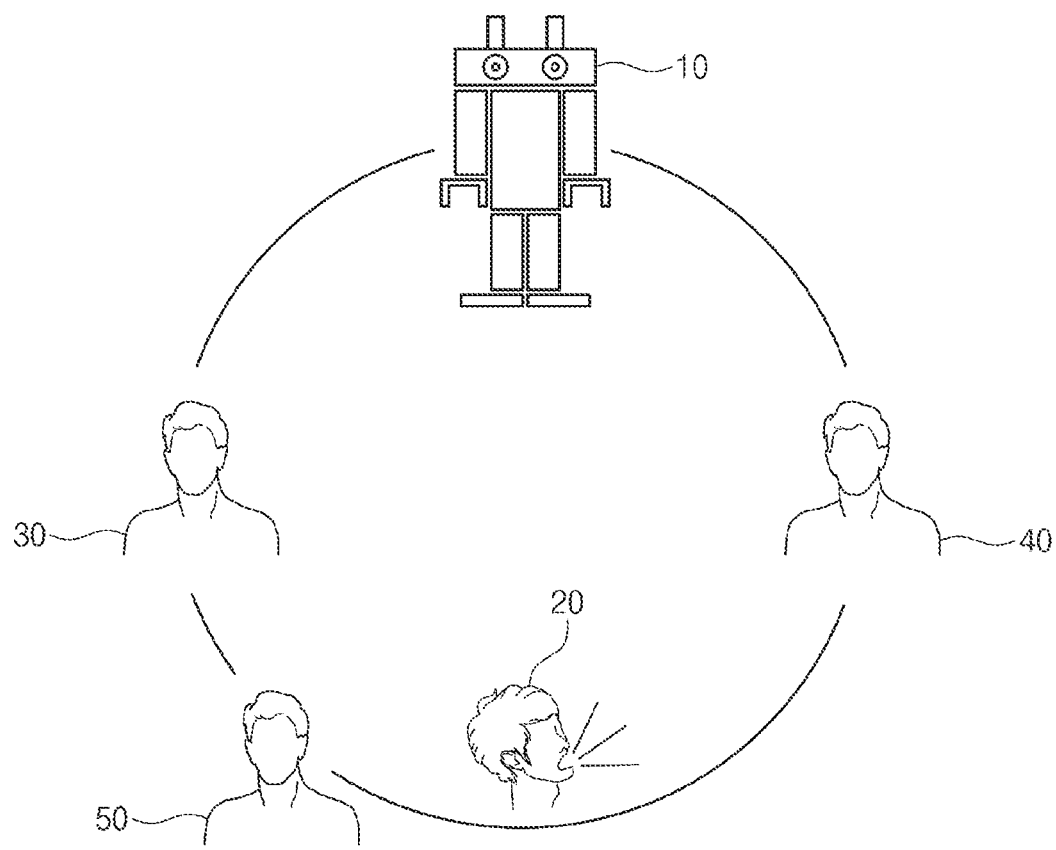
FIG. 1 is a view illustrating a multi-party interaction system according to an embodiment of the inventive concept.

FIG. 1 is a view illustrating a multi-party interaction system according to an embodiment of the inventive concept. Referring to FIG. 1, the multi-party interaction system includes a robot 10, an active participant 20, an addressee 30, a side-participant 40, and a bystander 50.

The robot 10 performs an interaction operation with a plurality of participants. For natural interaction with a plurality of participants, the robot 10 mounts an interaction device according to an embodiment of the technical idea of the present application, which will be described below with reference to FIGS. 2 to 8.

The interaction device mounted on the robot 10 may classify the roles of a plurality of participants according to a participation degree and/or a participation action state.

For example, the interaction device mounted on the robot 10 may classify a plurality of participants in the order of the active participant 20, the addressee 30, the side-participant 40 and the bystander 50 according to the size order of a participation degree value corresponding to each participant.

As another example, the interaction device mounted on the robot 10 classifies a participant with the highest participation degree among a plurality of participants as the active participant 20, classifies a participant in a participation action state having a high participation degree among the plurality of participants but waiting for an interaction order as the addressee 30, classifies a participant with a relatively low participation degree among the plurality of participants as the side-participant 40, and classifies a participant with the lowest participation degree among the plurality of participants as the bystander 50.

The interaction device mounted on the robot 10 may control the robot 10 to provide a customized interaction for each participant according to the classified roles.

For example, the interaction device may control the flow of turn taking so that the interaction is progressed based on the active participant 20 and the addressee 30. In addition, the interaction device may alter the subject of conversation or create a question to induce the side-participant 40 and the bystander 50 to participate in the interaction.

In such a way, an interaction device according to the technical idea of the present application and the robot 10 equipped with the interaction device may perform natural interaction operations by classifying the roles of a plurality of participants according to a participation degree and/or a participation action state and providing customized interactions for each participant according to the classified roles.

Moreover, it should be understood that the above description is exemplary and that the technical idea of the present application is not limited thereto. For example, it is assumed in FIG. 1 that the number of participants interacting with a robot is four. However, this is exemplary, and an interaction device according to the technical idea of the present application and a robot equipped with the interaction device may perform an interaction operation with two or three participants and also may perform an interaction operation with five or more participants.

Figure 2:
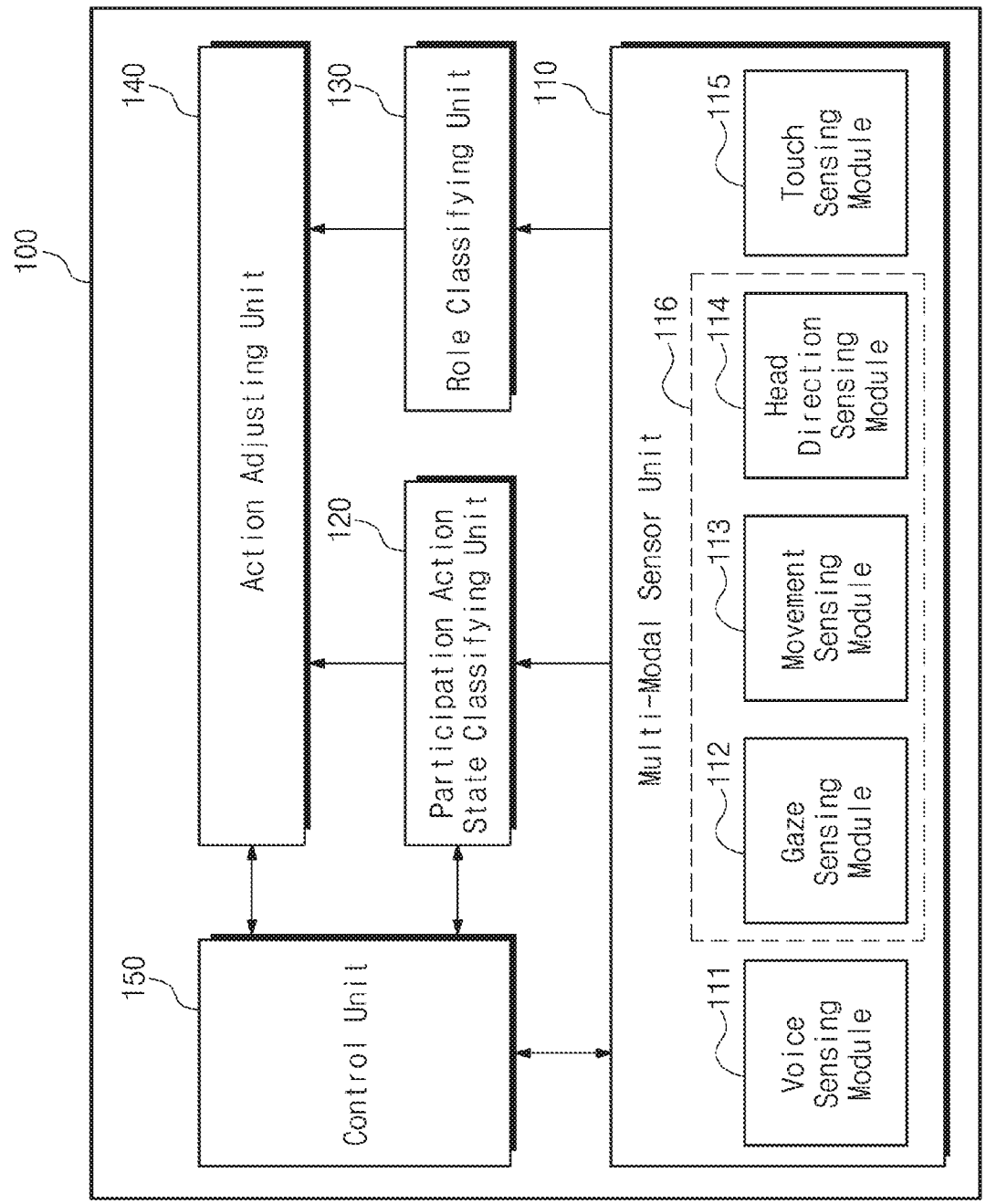
FIG. 2 is a block diagram illustrating an interaction device according to the technical idea of the present application.

FIG. 2 is a block diagram illustrating an interaction device 100 according to the technical idea of the present application. Referring to FIG. 2, the interaction device 100 includes a multi-modal sensor unit 110, a participation action state classifying unit 120, a role classifying unit 130, an action adjusting unit 140, and a control unit 150.

The multi-modal sensor unit 110 senses an external stimulus for each of a plurality of participants and provides the sensed external stimulus to the participation action state classifying unit 120 and the role classifying unit 130. The multi-modal sensor unit 110 includes a voice sensing module 111, a gaze sensing module 112, a movement sensing module 113, a head direction sensing module 114, and a touch sensing module 115.

The voice sensing module 111 senses the voice of each of a plurality of participants. The voice sensing module 111, for example, may be implemented using a voice recognition sensor connected to a microphone or a micro-microphone. The voice sensing module 111 provides voice information on each of a plurality of participants to the participation action state classifying unit 120 and the role classifying unit 130.

The gaze sensing module 112 senses the gaze direction of each of a plurality of participants. The movement sensing module 113 senses movements such as hand movements, gestures, body postures, and the like for each of a plurality of participants. The head direction sensing module 114 senses to which direction the head direction of each of the plurality of participants points with respect to a robot.

Each of the gaze sensing module 112, the movement sensing module 113, and the head direction sensing module 114 may be implemented by a camera, a 3D Depth camera, or they may be implemented integrally by a single camera or a single 3D Depth camera. Each of the gaze sensing module 112, the movement sensing module 113, and the head direction sensing module 114 provides sensed gaze direction information, movement information, and head direction information to the participation action state classifying unit 120 and the role classifying unit 130.

The touch sensing module 115 senses whether each of a plurality of participants directly touches the interaction device 100 or a robot with the interaction device 100. The touch sensing module 115, for example, may be implemented using a tactile sensor. The touch sensing module 115 provides touch information on each of a plurality of participants to the participation action state classifying unit 120 and the role classifying unit 130.

The participation action state classifying unit 120 receives external stimulus information on each of a plurality of participants from the multi-modal sensor unit 110. For example, the participation action state classifying unit 120 receives voice information, gaze direction information, movement information, head direction information, and touch information on each of a plurality of participants from the multi-modal sensor unit 110.

The participation action state classifying unit 120 determines the participation action state of each of a plurality of participants based on the received external stimulus information. The participation action state classifying unit 120 may classify the participation action state of each of a plurality of participants into one of a Grab state, a Release state, a Wait state, and a Keep state. An operation and configuration of the participation action state classifying unit 120 will be described in more detail with reference to FIG. 3.

The role classifying unit 130 receives external stimulus information on each of a plurality of participants from the multi-modal sensor unit 110. For example, the role classifying unit 130 receives voice information, gaze direction information, movement information, head direction information, and touch information on each of a plurality of participants from the multi-modal sensor unit 110.

The role classifying unit 130 determines the role of each of a plurality of participants based on the received external stimulus information. For example, the role classifying unit 130 may classify the role of each of a plurality of participants into one of an active participant, an addressee, a side-participant, and a bystander. A configuration and operation of the role classifying unit 130 will be described in more detail with reference to FIG. 4.

The action adjusting unit 140 receives participation action state information on each of a plurality of participants from the participation action state classifying unit 120 and receives role information on each of a plurality of participants from the role classifying unit 120. Based on the received participation action state information and role information, the action adjusting unit 140 controls the interaction device 100 or a robot equipped with the interaction device 100 to perform a customized interaction operation with respect to each of a plurality of participants.

For example, when receiving four participation action state information (e.g., Grab state, Release state, Wait state, and Keep state) from the participation action state classifying unit 120 and receiving four role information (e.g., active participant, addressee, side-participant, and bystander) from the role classifying unit 130, the action adjusting unit 140 may provide various different customized interaction operations using the participation action state information and the role information.

For example, if any one of a plurality of participants corresponds to a Grab state and an addressee, the participation action state classifying unit 120 may control the interactive device 100 so that a turn taking operation which changes the dialogue order of a corresponding participant is performed. However, this is exemplary and may be applied variously according to a designer. For example, an interaction expression method and/or content of a customized interaction type and a robot's gaze, voice, gesture, and operation with respect to each participant may be variously changed according to a designer.

Moreover, the control unit 150 is connected to the multi-modal sensor unit 110, the participation action state classifying unit 120, the role classifying unit 130, and the action adjusting unit 140 and controls an overall operation of the interaction device 100.

Figure 3:
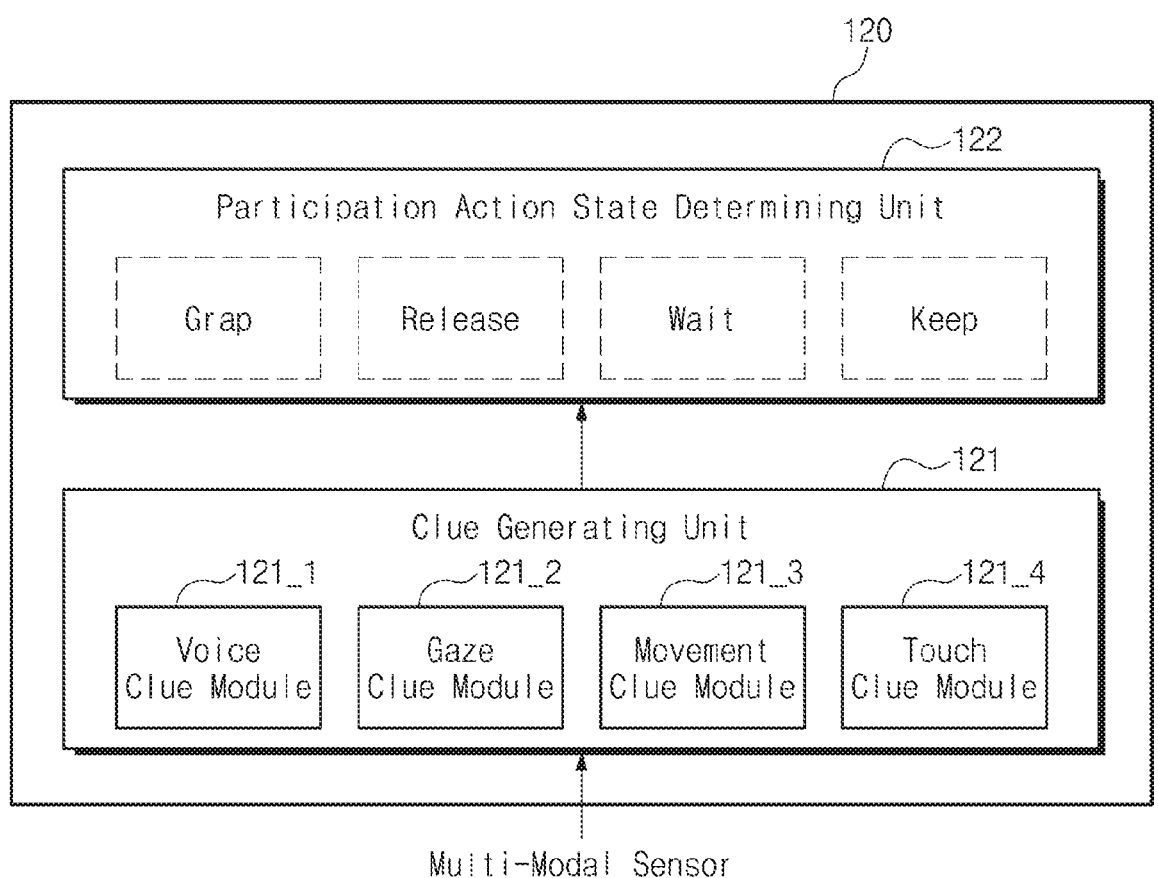
FIG. 3 is a block diagram illustrating a configuration of an action state classifying unit of FIG. 2 in detail.

FIG. 3 is a block diagram illustrating a configuration of the participation action state classifying unit of FIG. 2 in detail. Referring to FIG. 3, the participation action state classifying unit 120 includes a clue generating unit 121 and a participation action state determining unit 122.

The clue generating unit 121 receives external stimulus information on each of a plurality of participants from the multi-modal sensor 110, and generates a state determination clue for each of a plurality of participants using the external stimulus information. The clue generating unit 121 includes a voice clue module 121_1, a gaze clue module 121_2, a movement clue module 121_3, and a touch clue module 121_4.

The voice clue module 121_1 receives voice information from the voice sensing module 111, and generates a voice state determination clue based on the received voice information. The voice state determination clue may include, for example, utterance, temporary pause (i.e., pause) of utterance, high intonation, and flat intonation.

The gaze clue module 121_2 receives gaze direction information from the gaze sensing module 112, and generates a voice state determination clue based on the received gaze direction information. The gaze state determination clue, for example, may include information (i.e., eye contact) on whether a participant is looking at the interaction device 100 or a robot equipped with the interaction device 100.

The movement clue module 121_3 receives movement information from the movement sensing module 113, and generates a movement state determination clue based on the received movement information. The movement state determination clue may include, for example, information on whether there is a beck or a gesture, and information on the posture of a body.

The touch clue module 121_4 receives touch information from the touch module 114 and generates a touch state determination clue based on the received touch information. The touch state determination clue, for example, may include information on whether a participant has a clear touch to the interactive device 100 or a robot equipped with the interaction device 100.

The participation action state determining unit 122 receives a state determination clue such as a voice state determination clue, a gaze state determination clue, a movement state determination clue, and a touch state determination clue for each of a plurality of participants from the clue generating unit 121, and determines a participation action state for each of a plurality of participants using the state determination clue. The participation action state may include, for example, a Grab state, a Release state, a Wait state, and a Keep state.

The Grab state means a state to fetch the order of interaction. For example, when the state determination clues of a specific participant include clues such as utterance, eye contact, and touch, the participation action state determining unit 122 may determine the participation action state of a corresponding participant as the Grab state.

The Release state means a state in which the order of interaction is to be handed over to another participant. For example, when the state determination clues of a specific participant include clues such as a pause, no beck, or no gesture, the participation action state determining unit 122 may determine the participation action state of a corresponding participant as the Release state.

The Wait state means a state to wait for interaction order. For example, when the state determination clues of a specific participant include a voice state determination clue to agree with the opponent's speech, the participation action state determining unit 122 may determine the participation action state of a corresponding participant as the Wait state.

The Keep state means a state having the order of interaction. For example, when the state determination clues of a specific participant include clues such as a high intonation, a constant intonation, a beck, or a gesture, the participation action state determining unit 122 may determine the participation action state of a corresponding participant as the Keep state.

Meanwhile, the participation action state determining unit 122 provides the determined participation action state information on each of a plurality of participants to the action adjusting unit 140, and the action adjusting unit 140 uses the provided participation action state information on each of the plurality of participants to support a customized interaction operation.

Figure 4:
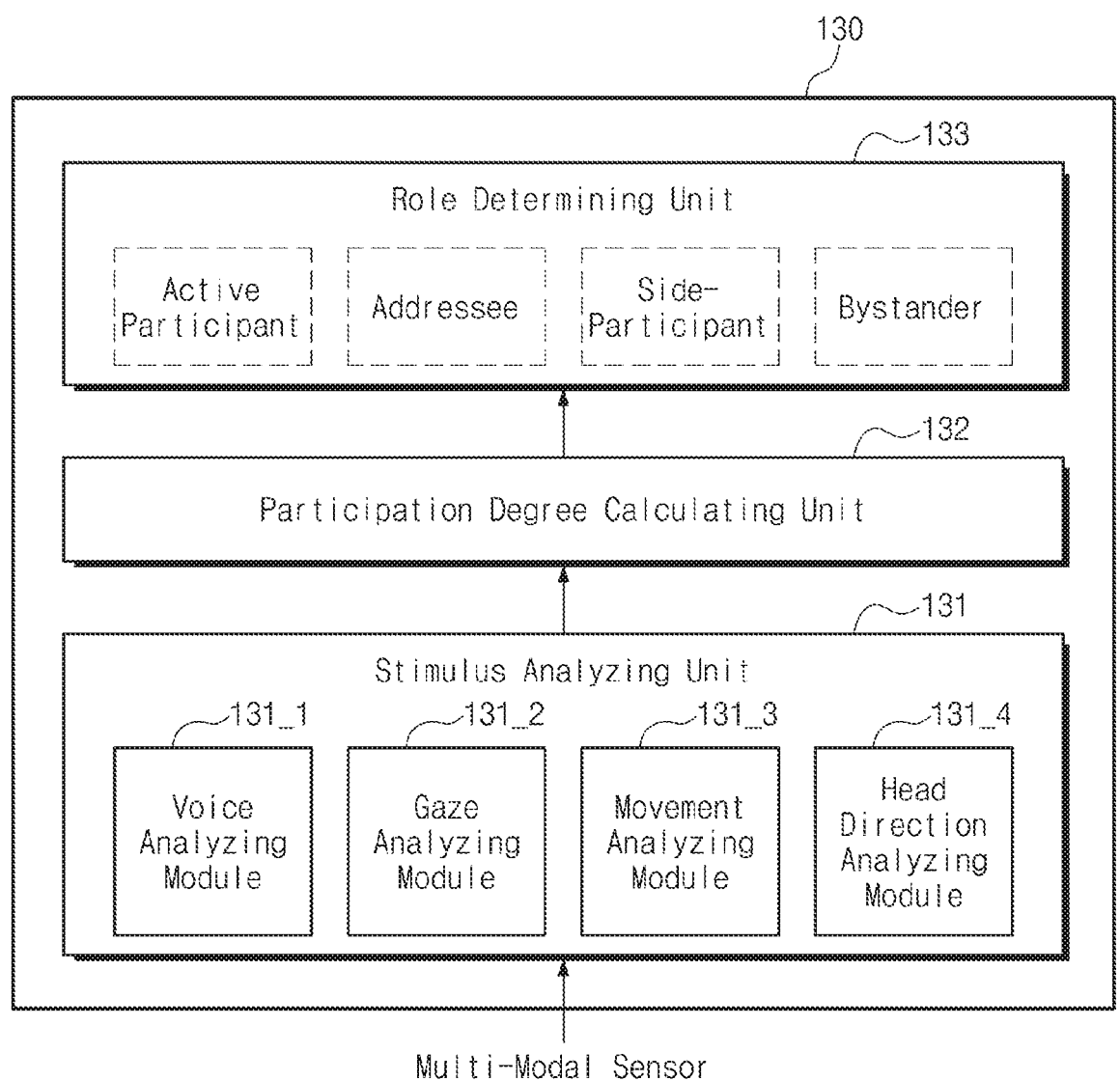
FIG. 4 is a block diagram illustrating a configuration of a role classifying unit of FIG. 2 in detail.

FIG. 4 is a block diagram illustrating a configuration of the role classifying unit 130 of FIG. 2 in detail. Referring to FIG. 4, the role classifying unit 130 includes a stimulus analyzing unit 131, a participation degree calculating unit 132, and a role determining unit 133.

The stimulus analyzing unit 131 receives external stimulus information on each of a plurality of participants from the multi-modal sensor 110, and generates a participation degree factor for each of a plurality of participants using the external stimulus information. The stimulus analyzing unit 131 includes a voice analyzing module 131_1, a gaze analyzing module 131_2, a movement analyzing module 131_3, and a head direction analyzing module 131_4.

The voice analyzing module 131_1 receives voice information from the voice sensing module 111, and generates a voice participation degree factor based on the received voice information. The voice participation degree factor may include, for example, a state of speaking, a state of no speaking for a certain period of time, or a state of no speaking beyond a certain period of time.

The gaze analyzing module 131_2 receives gaze direction information from the gaze sensing module 112, and generates a gaze participation degree factor based on the received gaze information. The gaze participation degree factor, for example, may include information on whether a participant is looking at the interaction device 100 or a robot equipped with the interaction device 100 (i.e., eye contact).

The movement analyzing module 131_3 receives movement information from the movement sensing module 113, and generates a movement participation degree factor based on the received movement information. The movement participation degree factor may include, for example, information on whether there is a beck or a gesture, or information on the posture of a body.

The head direction analyzing module 131_4 receives head direction information from the touch module 114, and generates a head direction participation degree factor based on the received head direction information. The head direction participation degree factor, for example, may include information on whether the head of a participant is facing upward, downward, leftward or rightward with respect to a robot.

The participation degree calculating unit 132 receives a voice participation degree factor, a gaze participation degree factor, a movement participation degree factor, and a head direction participation degree factor for each of a plurality of participants from the stimulus analyzing unit 131, and determines a participation degree for each of the plurality of participants using these factors.

More specifically, the participation degree of a particular participant may be expressed as $P_d(i)$. The voice participation degree factor, the gaze participation degree factor, the movement participation degree factor, the head direction participation degree factor, and the participation action state factor, each of which is a factor to determine the participation degree $P_d(i)$, may be expressed as $V_s(i)$, $G_s(i)$, $M_s(i)$, $H_p(i)$, and $A_s(i)$, respectively. The participation degree of a particular participant $P_d(i)$ may be determined by a set of the voice participation degree factor $V_s(i)$, the gaze participation degree factor $G_s(i)$, the movement participation degree factor $M_s(i)$, the head direction participation degree factor $H_s(i)$, and the participation action state factor $A_s(i)$.

Specifically, for example, if a particular participant is in a talking state, this positively affects the voice participation degree factor $V_s(i)$ and the participation degree $P_d(i)$. On the other hand, if a particular participant belongs to a state without speech for a certain period of time or beyond a certain period of time, this negatively affects the voice participation degree factor $V_s(i)$ and the participation degree $P_d(i)$.

If the gaze of a particular participant is directed to the interaction device 100 or a robot equipped with the interaction device 100, this positively affects the gaze participation degree factor $G_s(i)$ and the participation degree $P_d(i)$. On the other hand, if the gaze of a particular participant is not directed to the interaction device 100 or a robot equipped with the interaction device 100, this negatively affects the gaze participation degree factor $G_s(i)$ and the participation degree $P_d(i)$.

If a particular participant's beck or gesture is sensed, this positively affects the movement participation degree factor $M_s(i)$ and the participation degree $P_d(i)$. On the other hand, if a particular participant's beck or gesture is not sensed, this negatively affects the movement participation degree factor $M_s(i)$ and the participation degree $P_d(i)$.

If the head direction of a particular participant is directed to the front based on the interaction device 100 or a robot equipped with the interaction device 100, this positively affects the head direction participation degree factor $H_s(i)$ and the participation degree $P_d(i)$. On the other hand, if the head direction of a particular participant is directed to another direction based on the interaction device 100 or a robot equipped with the interaction device 100, this negatively affects the head direction participation degree factor $H_s(i)$ and the participation degree $P_d(i)$.

The calculation method of the participation degree $P_d(i)$ may be expressed as Equation 1 below.

$$P_d(X) = \frac{\sum_{j=1}^{n} W_j \cdot F_s(i)}{N} \quad \text{[Equation 1]}$$

Herein, $P_d(X)$ represents a participation degree value for a participant X. $F_s(i)$ represents a set of the voice participation degree factor $V_s(i)$, the gaze participation degree factor $G_s(i)$, the movement participation degree factor $M_s(i)$, the head direction participation degree factor $H_s(i)$, and the participation action state factor $A_s(i)$. Because $F_s(i)$ uses five characteristic values, n=5. In addition, a weight for each participation degree factor may be used in the calculation of the participation degree $P_d(i)$. The weight may be expressed by $W_j$ as shown in Equation 1.

Referring to FIG. 4, the role determining unit 133 receives a participation degree value for each of a plurality of participants from the participation degree calculating unit 132. The role determining unit 130 may determine the role of each of a plurality of participants as one of an active participant, an addressee, a side-participant, and a bystander based on the received participation degree value.

For example, the role determining unit 133 may classify a participant having the highest participation degree value among a plurality of participants as an active participant. In this case, the role determining unit 133 may determine an active participant according to an Equation 2 below.

$$P_a(X) = \text{Max}\{P_d(1), P_d(2), P_d(3) \ldots P_d(k)\} \quad \text{[Equation 2]}$$

Here, $P_d(1)$ and $P_d(2)$ indicate a first participant and a second participant, respectively. $P_a(X)$ indicates an active participant, and k indicates the number of participants.

As another example, the role determining unit 133 may classify a plurality of participants as the order of an addressee, a side-participant, and a bystander according to the size order of a participation degree value. However, this is exemplary and it should be understood that the role determining unit 133 may classify the participants' roles in various ways based on a participation degree value for each of a plurality of participants.

Meanwhile, the role determining unit 133 provides the determined role information on each of a plurality of participants to the action adjusting unit 140 (see FIG. 2), and the action adjusting unit 140 uses the provided role information on each of the plurality of participants together with the participation action state information to support a customized interaction operation.

Figure 5:
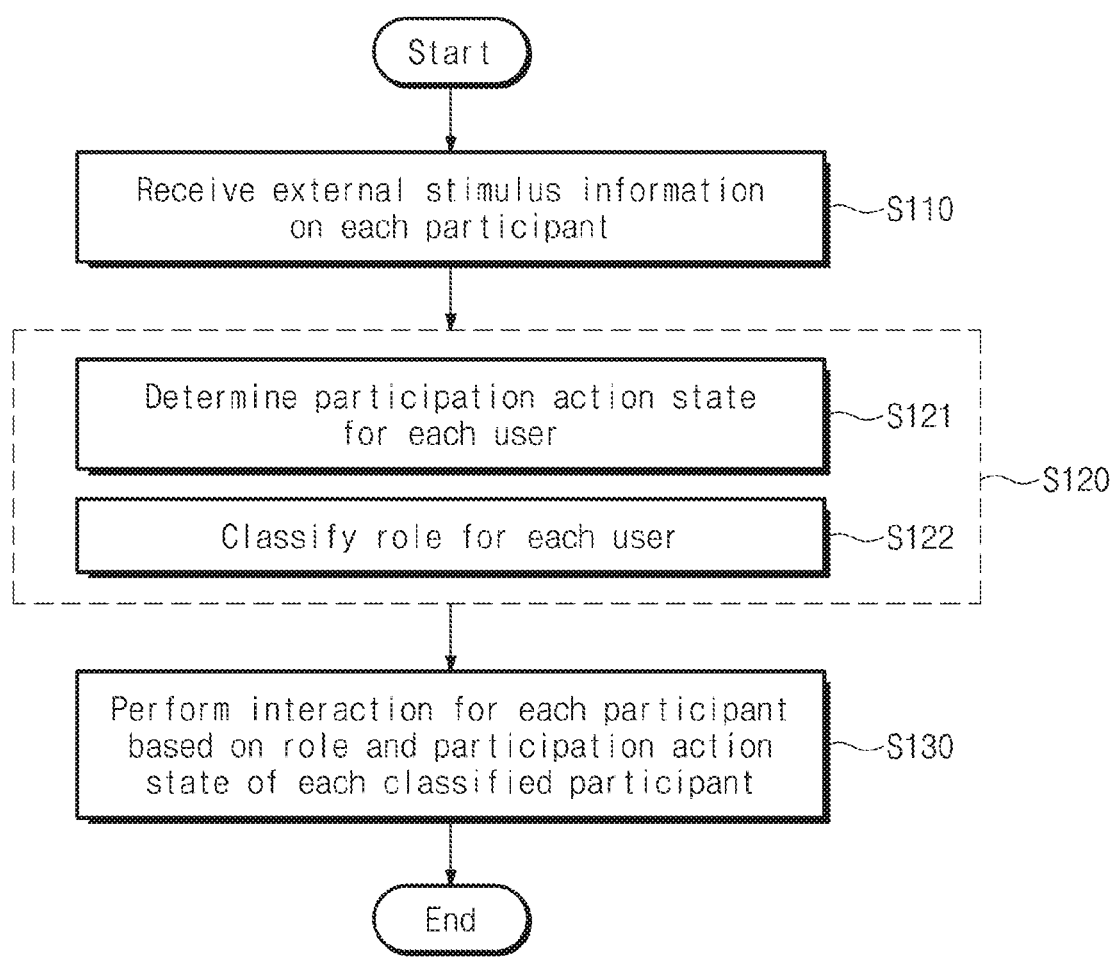
FIG. 5 is a flowchart illustrating an operation of an interaction device of FIG. 2.

FIG. 5 is a flowchart illustrating an operation of the interaction device 100 of FIG. 2.

In operation S110, the multi-modal sensor unit 110 senses an external stimulus for each of a plurality of participants and provides the sensed external stimulus to the participation action state classifying unit 120 and the role classifying unit 130. For example, the multi-modal sensor unit 110 provides voice information, gaze direction information, movement information, head direction information, and/or touch information on each of a plurality of participants to the participation action state classifying unit 120 and the role classifying unit 130.

In operation S120, the participation action state classifying unit 120 determines the participation action state of each of a plurality of participants based on the received external stimulus information and the role classifying unit 130 determines the role of each of a plurality of participants based on the received external stimulus information. In this case, the participation action state classifying unit 120 and the role classifying unit 130 may perform a participation action state determining operation and a role determining operation in parallel.

For example, the participation action state classifying unit 120 may classify the participation action state of each of a plurality of participants into one of a Grab state, a Release state, a Wait state, and a Keep state (operation S121). The role classifying unit 130 may classify the role of each of a plurality of participants into one of an active participant, an addressee, a side-participant, and a bystander. Each of the participation action state classifying unit 120 and the role classifying unit 130 provides participation action state information and role information to the action adjusting unit 140.

In operation S130, based on the received participation action state information and role information, the action adjusting unit 140 controls the interaction device 100 or a robot equipped with the interaction device 100 to perform a customized interaction operation with respect to each of a plurality of participants.

Figure 6:
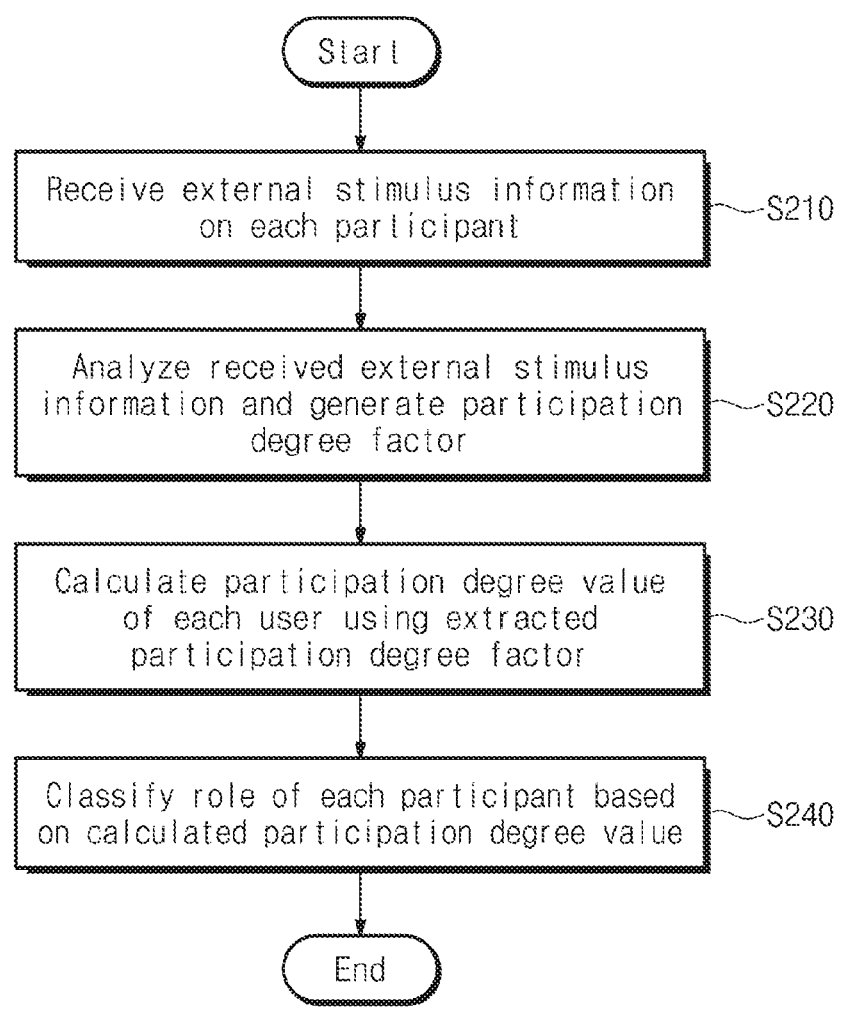
FIG. 6 is a flowchart illustrating an operation of a role classifying unit of FIG. 4.

FIG. 6 is a flowchart illustrating an operation of the role classifying unit 130 of FIG. 4.

In operation S210, the stimulus analyzing unit 131 receives external stimulus information on each of a plurality of participants from the multi-modal sensor unit 110.

In operation S220, the stimulus analyzing unit 131 generates a participation degree factor for each of a plurality of participants by using the received external stimulus information. The stimulus analyzing unit 131, for example, may generate a voice participation degree factor, a gaze participation degree factor, a movement participation degree factor, and a head direction participation degree factor for each of a plurality of participants.

In operation S230, the participation degree calculating unit 132 calculates a participation degree value for each of a plurality of participants using a voice participation degree factor, a gaze participation degree factor, a movement participation degree factor, and a head direction participation degree factor for each of a plurality of participants from the stimulus analyzing unit 131.

In operation S240, the role determining unit 130 may determine the role of each of a plurality of participants as one of an active participant, an addressee, a side-participant, and a bystander based on a participation degree value for each of a plurality of participants. For example, the role determining unit 133 may classify a plurality of participants as the order of an addressee, a side-participant, and a bystander according to the size order of a participation degree value.

As described above, the interaction device 100 according to the technical idea of the present application classifies the roles of a plurality of participants according to a participation degree value, and provides a customized interaction for each of a plurality of participants based on a role and a participation action state for each of a plurality of participants. Thus, the interaction device 100 may perform a natural interaction.

Figure 7:
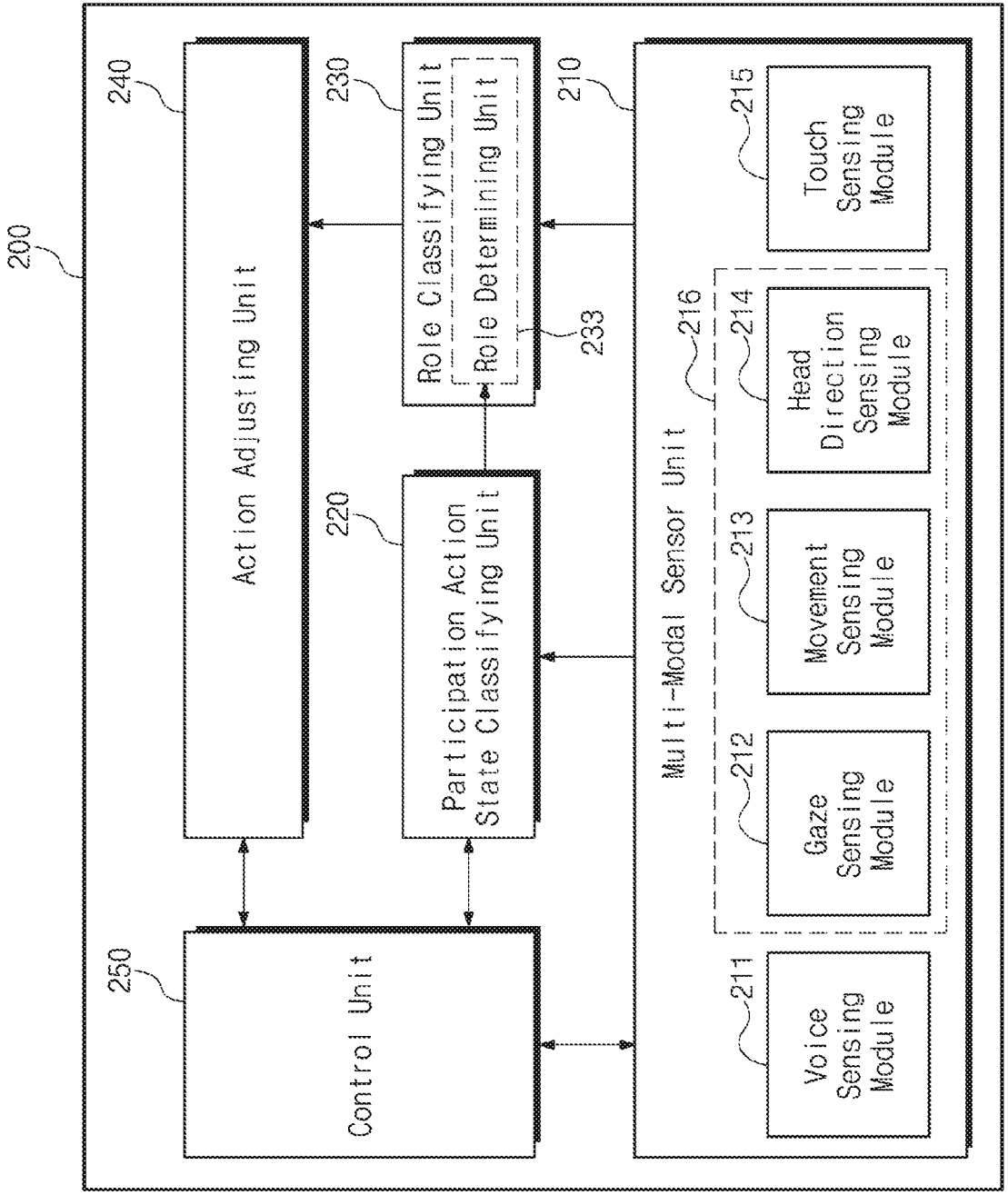
FIG. 7 is a view illustrating an interaction device according to another embodiment of the technical ideal of the inventive concept.

FIG. 7 is a view illustrating an interaction device 200 according to another embodiment of the technical ideal of the inventive concept. The interaction device 200 of FIG. 7 is similar to the interaction device 100 of FIG. 2. Thus, for clear description, like elements are described using like reference numerals. Further, for simple description, components identical or similar to those of the interaction device 100 of FIG. 2 will not be described.

Referring to FIG. 7, the interaction device 200 includes a multi-modal sensor unit 210, a participation action state classifying unit 220, a role classifying unit 230, an action adjusting unit 240, and a control unit 250.

Unlike the participation action state classifying unit 120 of the interaction device 100 of FIG. 2, the participation action state classifying unit 220 of FIG. 7 provides participation action state information to the role classifying unit 230. The role classifying unit 230 includes a role determining unit 233, and the role determining unit 233 determines the role for each of a plurality of participants referring to the received participation action state information.

In other words, the role determining unit 233 may determine the role for each of a plurality of participants using not only a participation degree value for each of a plurality of participants calculated by the role classifying unit 230, but also participation action state information on each of a plurality of participants received from the participation action state classifying unit 220.

For example, the role determining unit 233 classifies a participant in a participation action state having a high participation degree among a plurality of participants but waiting for an interaction order as an addressee 30 and classifies a participant in a participation action state having a low participation degree among a plurality of participants but waiting for an interaction order as a side-participant 40. However, it should be understood that the role determining unit 233 may classify the roles of a plurality of participants in various ways by using various combinations of the participation action state information and the role information.

Figure 8:
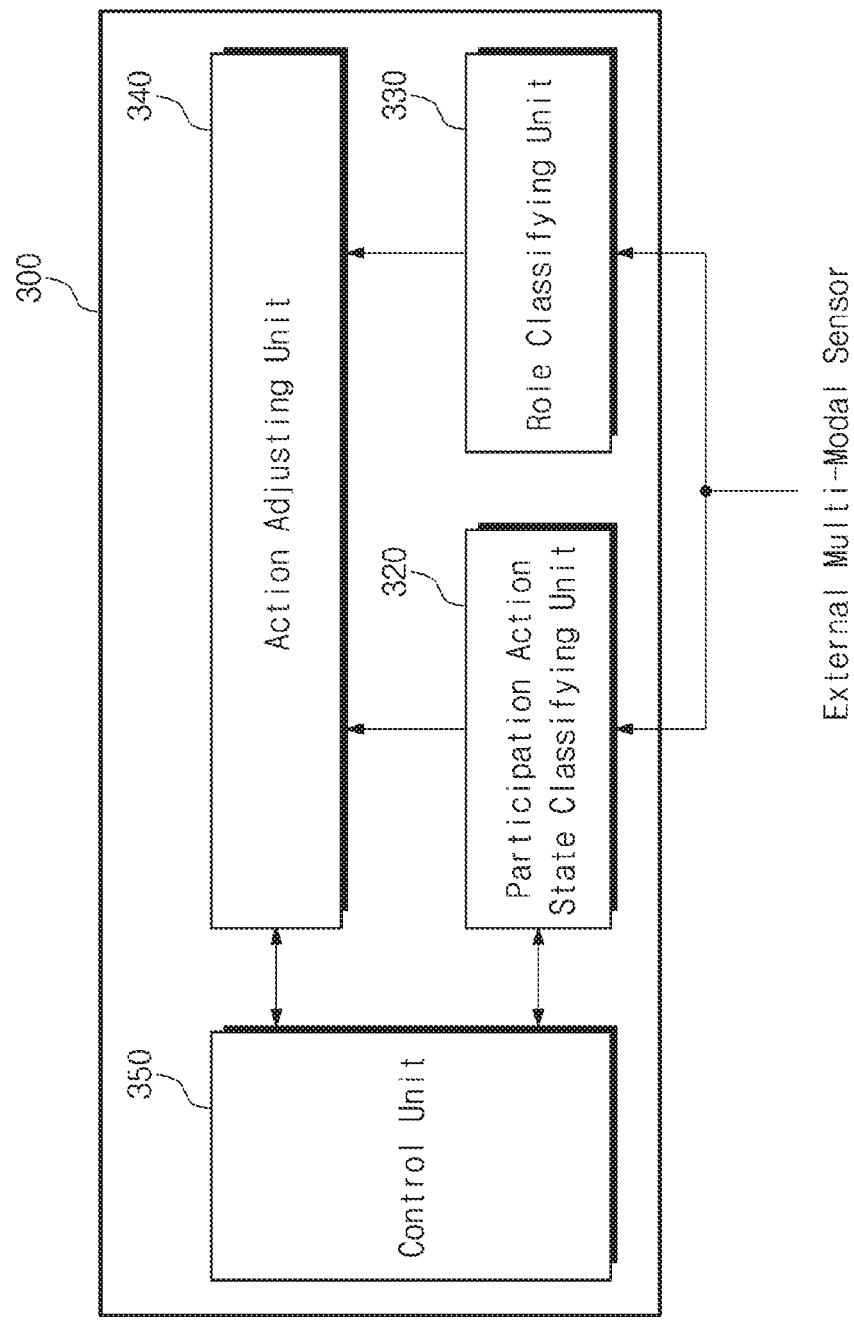
FIG. 8 is a view illustrating an interaction device according to another embodiment of the technical ideal of the inventive concept.

FIG. 8 is a view illustrating an interaction device 300 according to another embodiment of the technical ideal of the inventive concept. The interaction device 300 of FIG. 8 is similar to the interaction device 100 of FIG. 2. Thus, for clear description, like elements are described using like reference numerals. Further, for simple description, components identical or similar to those of the interaction device 100 of FIG. 2 will not be described.

Referring to FIG. 8, the interaction device 300 includes a participation action state classifying unit 320, a role classifying unit 330, an action adjusting unit 340, and a control unit 350.

Unlike the participation action state classifying unit 120 of the interaction device 100 of FIG. 2, the interaction device 300 of FIG. 8 does not include a multi-modal sensor unit. In other words, the interaction device 300 of FIG. 8 receives external stimulus information on each of a plurality of participants from an externally installed multi-modal sensor. In this case, the participation action state classifying unit 320 and the role classifying unit 330 may receive external stimulus information on each of a plurality of participants from outside via wired or wireless communication.

An interaction device according to an embodiment of the present application classifies the roles of a plurality of participants according to a participation degree and/or an action state and provides a customized interaction operation for each of participants according to the classified roles. Accordingly, an interaction device according to an embodiment of the present application may perform a natural interaction operation with a plurality of participants.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An interaction device comprising a processor and a memory storing at least one instruction to be executed by the processor, wherein the at least one instruction is configured to:

perform a participation action state classifying corresponding to classifying a participation action state for each of the plurality of participants based on an external stimulus signal for each of the plurality of participants;

perform a participation degree calculating corresponding to calculating a participation degree value for each of the plurality of participants based on the external stimulus signal for each of the plurality of participants;

perform a role classifying corresponding to classifying a role for each of a plurality of participants based on both of the participation action state for each of the plurality of participants and the participation degree value for each of the plurality of participants; and perform an action adjusting corresponding to performing different interaction operations for each of the plurality of participants based on the role for each of the plurality of participants, wherein the role is any one of an active participant, a addressee, a side-participant, and a bystander, wherein the role of each of the plurality of participants is determined in order of the active participant, the addressee, the side-participant and the bystander in descending order of the participation degree value corresponding to each of the plurality of participants, wherein the participation action state indicates a subsequent expected order of interaction for each of the plurality of participants, wherein the participation action state is any one of a Grab state, a Release state, a Wait state and a Keep state, wherein the Grab state indicates that a participant is expected to subsequently fetch the order of interaction, wherein the Release state indicates that a participant is expected to subsequently hand over the order of interaction to another participant, wherein the Wait state indicates that a participant is expected to subsequently wait for the order of interaction, and wherein the Keep state indicates that a participant is expected to subsequently keep the order of interaction.

2. The interaction device of claim 1, wherein the role classifying comprises:
analyzing external stimulus information on each of the plurality of participants; and
calculating a participation degree value for each of the plurality of participants based on the external stimulus information.

3. The interaction device of claim 2, wherein the analyzing external stimulus information comprises:
generating a voice participation degree factor for each of the plurality of participants based on voice information on each of the plurality of participants;
generating a gaze participation degree factor for each of the plurality of participants based on gaze information on each of the plurality of participants;
generating a movement participation degree factor for each of the plurality of participants based on movement information on each of the plurality of participants; and
generating a head direction participation degree factor for each of the plurality of participants based on head direction information on each of the plurality of participants.

4. The interaction device of claim 3, wherein the participation degree value for each of the plurality of participants is calculated based on the voice participation degree factor, the gaze participation degree factor, the movement participation degree factor, and the head direction participation degree factor.

5. The interaction device of claim 4, wherein the participation degree is calculated by assigning different weights to the voice participation degree factor, the gaze participation degree factor, the movement participation degree factor, and the head direction participation degree factor.

6. The interaction device of claim 1, wherein the participation action state classifying comprises:
generating a state determination clue for each of the plurality of participants based on an external stimulus signal for each of the plurality of participants; and
determining a participation action state of each of the plurality of participants based on the state determination clue for each of the plurality of participants.

7. The interaction device of claim 6, the generating the state determination clue comprises:
generating a voice state determination clue for each of the plurality of participants based on voice information on each of the plurality of participants;
generating a gaze state determination clue for each of the plurality of participants based on gaze information on each of the plurality of participants;
generating a movement state determination clue for each of the plurality of participants based on movement information on each of the plurality of participants; and
generating a touch state determination clue for each of the plurality of participants based on touch information on each of the plurality of participants.

8. The interaction device of claim 7, wherein the participation action state of each of the plurality of participants is determined based on at least one of the voice state determination clue, the gaze state determination clue, the movement state determination clue, and the touch state determination clue.

9. The interaction device of claim 1, wherein the at least one instruction is further configured to perform multi-modal sensing the external stimulus for each of the plurality of participants.

10. The interaction device of claim 9, wherein the multi-modal sensing comprises:
sensing a voice for each of the plurality of participants;
sensing a image for sensing at least one of a gaze, a movement, and a head direction for each of the plurality of participants; and
sensing a touch action for each of the plurality of participants.

11. An interaction method comprising:
receiving external stimulus information on each of a plurality of participants from a multi-modal sensor unit;
determining a participation action state of each of the plurality of participants based on the external stimulus information on each of the plurality of participants;
calculating a participation degree value for each of the plurality of participants based on the external stimulus information on each of the plurality of participants;
determining a role of each of the plurality of participants based on both of the participation action state on each of the plurality of participants and the participation degree value on each of the plurality of participants; and
performing different interaction operations for the plurality of participants based the role of each of the plurality of participants,
wherein the role is any one of an active participant, a addressee, a side-participant, and a bystander,
wherein the role of each of the plurality of participants is determined relatively among the plurality of participants in order of the active participant, the addressee, the side-participant, and the bystander in descending order of the participation degree value corresponding to each of the plurality of participants, wherein the participation action state indicates a subsequent expected order of interaction for each of the plurality of participants, wherein the participation action state is any one of a Grab state, a Release state, a Wait state and a Keep state, wherein the Grab state indicates that a participant is expected to subsequently fetch the order of interaction, wherein the Release state indicates that a participant is expected to subsequently hand over the order of interaction to another participant, wherein the Wait state indicates that a participant is expected to subsequently wait for the order of interaction, and wherein the Keep state indicates that a participant is expected to subsequently keep the order of interaction.

12. The method of claim 11, wherein the determining of the participation action state of each of the plurality of participants is performed before the determining of the role of each of the plurality of participants, and the determining of the role of each of the plurality of participants determines a role of each of the plurality of participants based on both of the participation action state on each of the plurality of participants and the participation degree value on each of the plurality of participants.

13. The method of claim 11, wherein the determining of the role of each of the plurality of participants comprises:
generating a participation degree factor for each of the plurality of participants based on external stimulus information on each of the plurality of participants; and
calculating the participation degree value of each of the plurality of participants based on a participation degree factor for each of the plurality of participants.

14. The method of claim 13, wherein the participation degree factor is generated using at least one of voice information, gaze information, movement information, and head direction information.

15. The method of claim 14, wherein the participation degree is calculated by assigning a weight to at least one of the voice information, the gaze information, the movement information, and the head direction information.

* * * * *